United States Patent [19]
Zanoni

[11] Patent Number: 5,724,136
[45] Date of Patent: Mar. 3, 1998

[54] INTERFEROMETRIC APPARATUS FOR MEASURING MOTIONS OF A STAGE RELATIVE TO FIXED REFLECTORS

[75] Inventor: Carl A. Zanoni, Middlefield, Conn.

[73] Assignee: Zygo Corporation, Middlefield, Conn.

[21] Appl. No.: 730,753

[22] Filed: Oct. 15, 1996

[51] Int. Cl.$^6$ .............................. G01B 9/02; G01B 11/02
[52] U.S. Cl. ..................... 356/349; 356/351; 356/358
[58] Field of Search .............................. 356/349, 358, 356/351, 363

[56] References Cited

U.S. PATENT DOCUMENTS

| | | |
|---|---|---|
| 3,458,259 | 7/1969 | Bagley et al. |
| 3,656,853 | 4/1972 | Bagley et al. |
| 4,334,778 | 6/1982 | Pardue et al. ............... 356/351 |
| 4,647,206 | 3/1987 | Kunzmann et al. .......... 356/358 |
| 4,684,828 | 8/1987 | Sommargren ............... 359/326 |
| 4,687,958 | 8/1987 | Sommargren ............... 359/326 |
| 4,688,940 | 8/1987 | Sommargren et al. ....... 356/349 |
| 4,784,489 | 11/1988 | Cutler et al. ............... 356/351 |
| 5,274,436 | 12/1993 | Chaney ...................... 356/349 |
| 5,369,488 | 11/1994 | Morokuma .................. 356/358 |
| 5,392,120 | 2/1995 | Kamiya ...................... 356/349 |
| 5,400,143 | 3/1995 | Bauer ......................... 356/351 |
| 5,408,318 | 4/1995 | Slater ......................... 356/351 |
| 5,485,272 | 1/1996 | Dirksen et al. .............. 356/351 |

OTHER PUBLICATIONS

J.B. Ferguson, et al., "Single–Mode Collapse In 6328–A He–Ne Lasers", pp. 2924–2929 (Applied Optics, vol. 17, No. 18, Sep. 1978).

Der–Chin, Su., et al., "Simple two–frequency laser", pp. 161–163 (Precision Engineering, vol. 18, No. 2/3, Apr./May 1996).

Optical Fiber Sensors, Part 1: Sessions WAA to ThCC, pp. 40–43 (1988 Technical Digest Series, vol. 2, Part 1, New Orleans, Louisiana, Jan. 27–29, 1988).

T. Yoshino et al., "Fiber–Optic Remote Sensor for Displacement Using Differential Heterodyne Interferometer", pp. 863–866 (IOOC–ECOC 1985).

F. Favre, et al., "Effect of Semiconductor Laser Phase Noise on Ber Performance in an Optical DPSK Heterodyne–Type Experiment", pp. 964–965 (Electronic Letters, vol. 18, No. 22, Oct. 28, 1982).

G. Bouwhuis, "Interferometrie Met Gaslasers", pp. 225–232 (Ned T. Natuurk, vol. 34, Aug. 1968) and translated Abstract.

John N. Dukes, et al., "A Two–Hundred–Foot Yardstick with Graduations Every Microinch", pp. 2–16 (Hewlett–Packard Journal, Aug. 1970).

(List continued on next page.)

*Primary Examiner*—Frank G. Font
*Assistant Examiner*—Jason D. Vierra-Eisenberg
*Attorney, Agent, or Firm*—Bryan Cave LLP

[57] ABSTRACT

An interferometric system for measuring motions of a stage 16 relative to fixed reflectors 24, 25 comprises a source 10 of a single frequency, linearly polarized, frequency stabilized light beam which is launched into an optical fiber 12 to deliver the beam to a module 14 on the moving stage 16. The module 14 contains an acousto-optical device 42 or single to two frequency generator, for generating a beam with a frequency difference between the two orthogonal polarization components states of the beam exiting the generator 42, as well as beam shaping and splitting optics 40, 46, a pair of interferometers 52, 54, optical mixers, and focusing optics 32, 34 for launching the output beams 55, 57 of the interferometers 52, 54 onto optical fibers 26, 28 which deliver the interference signals to photoelectric detectors 36, 38 and processing electronics which provide data for the stage 16 motion.

16 Claims, 2 Drawing Sheets

OTHER PUBLICATIONS

N. Bobroff, "*Recent Advances In Displacement Measuring Interferometry*", pp. 907–926 (Measurement Science & Technology, vol. 4, No. 9, Sep. 1993).

H. Matsumoto, "*Recent Interferometric Measurements Using Stabilized Lasers*", pp. 87–94 (Precision Engineering, 1984).

Y. Ohtsuka, et al., "*Two–Frequency Laser Interferometer For Small Displacement Measurements In A Low Frequency Range*", pp. 219–224 (Applied Optics, vol. 18, No. 2, Jan. 1979).

N.A. Massie, et al., "*Measuring Laser Flow Fields With A 64–Channel Heterodyne Interferometer*", pp. 2141–2151 (Applied Optics, vol. 22, No. 14, Jul. 15, 1983).

Y. Ohtsuka, et al., "*Dynamic Two–Frequency Interferometry For Small Displacement Measurements*", pp. 25–29 (Optics and Laser Technology, Feb. 1984).

N.A. Riza, et al., "*Acousto–Optic System For The Generation And Control Of Tunable Low–Frequency Signals*", pp. 920–925 (Optical Engineering, vol. 35, No. 4, Apr. 1996).

INTERFEROMETRIC APPARATUS FOR MEASURING MOTIONS OF A STAGE RELATIVE TO FIXED REFLECTORS

FIELD OF THE INVENTION

The present invention relates to optical apparatus for measuring the displacement of a moving stage. The invention relates in particular to interferometric apparatus using light beams having two frequencies to measure displacement of a moving stage with the light source removed from the stage.

BACKGROUND AND PRIOR ART

The use of interferometry to measure changes in position, length, distance, angles, and optical length is well known, see for example, "Recent advances in displacement measuring interferometry" N. Bobroff, *Measurement Science & Technology*, pp. 907–926, Vol. 4, No. 9, September 1993 and commonly owned U.S. Pat. No. 4,688,940 by Sommargren and Schaham, issued Aug. 25, 1987. Since the laser sources for these interferometers are usually large and generate significant amounts of heat, they are usually mounted off the moving stage. This requires that one of the reflectors in the interferometer, e.g. a plano mirror, be mounted on the stage. There is usually one reflector per axis of displacement. For large motions and multiple axes of motion, this reflector or reflectors can get quite large and heavy; thereby, limiting the stage's dynamic performance. A prior art technique for dealing with this problem is found in U.S. Pat. No. 4,647,206 by H. Kunzman et. al., issued March 1987. U.S. Pat. No. 4,647,206 discloses a single frequency light beam delivered to an interferometer mounted on the moving stage via an optical fiber, and the intensity of the recombined beams is detected by photodetectors on the stage. The later is necessary because significant errors would be introduced by the optical fibers if the recombined beams were transmitted via optical fibers from the stage to photodetectors on the non-moving part of the apparatus.

Two frequency interferometry offers many advantages compared to single frequency interferometry especially for metrology applications requiring high precision and/or multiple axes, see for example *Hewlett Packard Journal* August 1970, U.S. Pat. No. 3,458,259 by A. Bagley et. al., issued July 1969, and U.S. Pat. No. 3,656,853 by Bagley et. al., issued April 1972.

T. Yoshino, "Heterodyne Technology for Optical Sensors", pp. 40–43, *Optical Fiber Sensors*, Technical Digest Series, Vol. 2, Part 1, Jan. 27–29, 1988 discloses various arrangements for using optical fibers to couple a two frequency light source with the interferometer. In particular, FIG. 3 in this paper discloses the need for a reference detector at the output end of the optical fiber prior to the interferometer to compensate for the adverse effects on the two orthogonally polarized light beams transmitted by the optical fiber to the interferometer. This, of course, adds cost and complexity to the apparatus since a single mode, polarization preserving fiber is required. U.S. Pat. No. 5,274,436 by R. Chaney, issued December 1993, discloses the same technique that Yoshino does.

F. Favre and D. Le Guen, *Electronics Letters*, 18,964 1982 and T. Yoshino and N. Yoshida, *Technical Digest of the International Conference on Integrated Optical Fibre Communication and the European Conference on Optical Communication*, Venice, Italy, October 1985, p. 863 disclose fiber optic based receivers for laser interferometric systems. U.S. Pat. No. 4,784,489 by L. Cutler et. al., issued November 1988, discloses the same technique that Favre and LeGuen and Yoshino do.

In the prior art two-optical frequency heterodyne interferometers, the two optical frequencies are produced by one of the following techniques: use of a Zeeman split laser, see for example, Bagley et al., U.S. Pat. No. 3,458,259, issued Jul. 29, 1969; G. Bouwhuis, "Interferometric Mit Gaslasers," Ned. T. Natuurk, Vol. 34, pp. 225–232 August 1968; *Hewlett Packard Journal* August 1970; Bagley et al., U.S. Pat. No. 3,656,853, issued Apr. 18, 1972; *Hewlett Packard Journal* April 1983; and H. Matsumoto, "Recent interferometric measurements using stabilized lasers," *Precision Engineering*, Vol. 62, pp. 87–94 1984; use of a pair of acousto-optic Bragg cells, see for example, Y. Ohtsuka and K. Itoh, "Two-frequency Laser Interferometer for Small Displacement Measurements in a Low Frequency Range," *Applied Optics*, Vol. 18, pp. 219–224 Jan. 15, 1979; N. Massie et al., "Measuring Laser Flow Fields With a 64-Channel Heterodyne Interferometer," *Applied Optics*, Vol. 22, pp. 2141–2151 1983; Y. Ohtsuka and M. Tsubokawa, "Dynamic Two-frequency Interferometry for Small Displacement Measurements," *Optics and Laser Technology*, Vol. 16, pp. 25–29 1984; H. Matsumoto, op. cit.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.*, Vol. 35, pp. 920–025 1996; use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., op. cit.; and commonly owned copending application entitled "Apparatus to Transform with High Efficiency a Single Frequency Linearly Polarized Laser Beam Into Beams with Two Orthogonally Polarized Frequency Components", filed Jul. 25, 1996, and bearing U.S. Ser. No. 08/686536; use of two longitudinal modes of a randomly polarized HeNe laser, see for example, J. B. Ferguson and R. H. Morris, "Single Mode Collapse in 6328 Å HeNe Lasers," *Applied Optics*, Vol. 17, pp. 2924–2929 1978; or use of an electro-optic modulator, see for example Der-Chin Suet. al., "Simple two-frequency laser", *Precision Engineering*, Vol. 18, pp. 161–163 1996.

The use of a Zeeman split laser or one using the two longitudinal modes does not lend itself to providing a two frequency source on the stage because of size and heat considerations. Similarly, the use of a Zeeman split laser or one using the two longitudinal modes does not lend itself to providing a two frequency source off the stage as opposed to on the stage, because the techniques disclosed in Yoshino 1988 must be used with their concomitant aforementioned limitations.

It is clear from the foregoing that the prior art does not provide a simple and practical method for measuring stage motion using two frequency displacement interferometry with the light source off the stage. This deficiency in the prior art has lead to the absence of any practical two frequency interferometric system with the light source and interferometer reflector elements off the moving stage.

SUMMARY OF THE INVENTION

In accordance with the instant invention, I provide an interferometric apparatus for measuring motions of a stage relative to fixed reflectors comprising: a source of a single frequency, linearly polarized, frequency stabilized beam which is launched into an optical fiber to deliver the beam to a module on the moving stage; the module containing a means, preferably acousto-optical, for generating a beam with a frequency difference between the two orthogonal polarization components states of the beam exiting the generator, beam shaping and splitting optics, one or more interferometers, one or more optical mixers, and one or more focusing optics to launch the output beams of the interferometers into one or more optical fibers which deliver the interference signals to photoelectric detectors and processing electronics which provide data for the stage motion.

BRIEF DESCRIPTION OF THE DRAWINGS

In the drawings, wherein like reference characters denote similar elements throughout the several views.

DETAILED DESCRIPTION OF THE INVENTION

Figure 1:
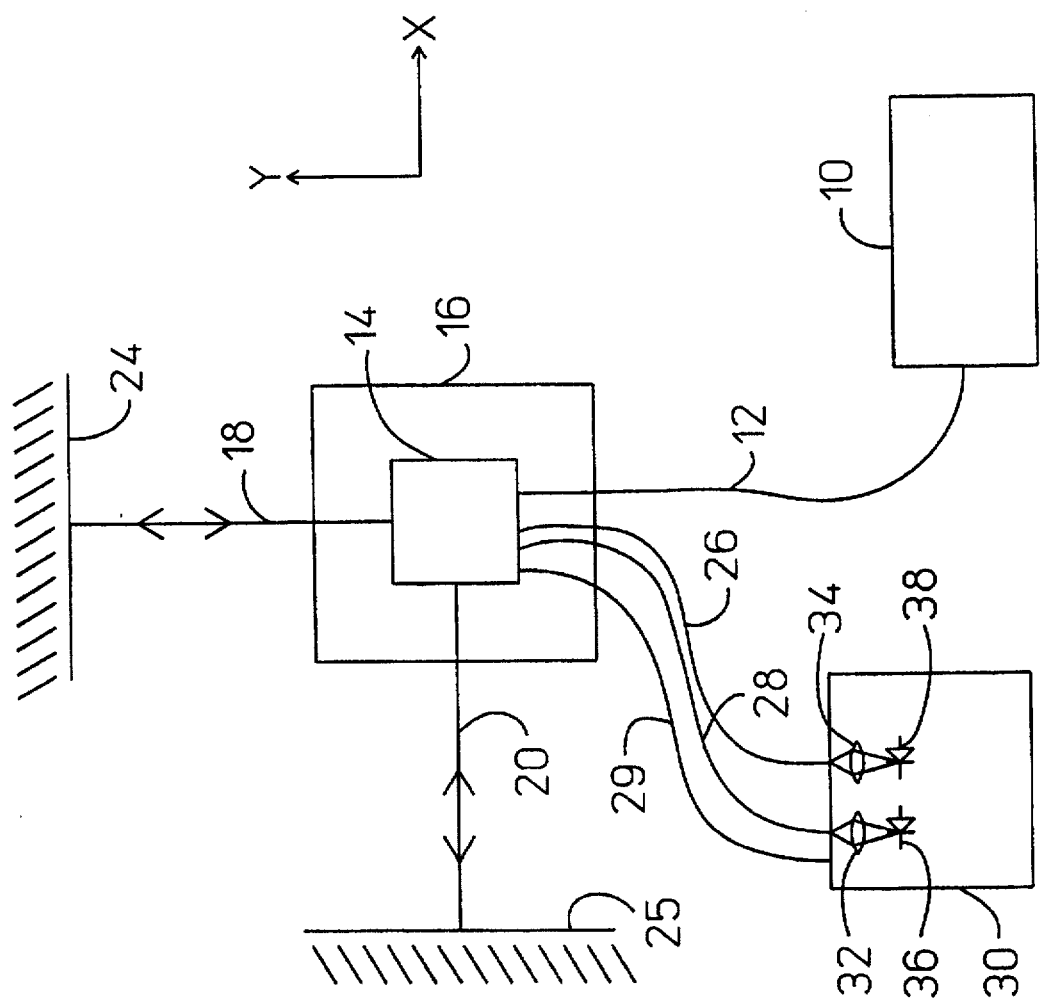
FIG. 1 is a drawing showing in schematic form a presently preferred embodiment of the present invention.

Referring now to the drawings in detail, FIG. 1 shows in schematic form a presently preferred embodiment of the present invention. A light source 10 provides a single frequency, linearly polarized, frequency stabilized light beam which is launched into optical fiber 12 using any of the well known methods. Optical fiber 12 delivers the light beam to a module 14 which is attached to a moving stage 16. Module 14 converts the light beam delivered by the optical fiber 12 into measurement beams 18 and 20. This conversion is described in detail with reference to FIG. 2. A pair of plano mirrors 24 and 25 are stationary, i.e., mounted on the non-moving part of the apparatus. The stage 16 can move in the plane of FIG. 1, i.e., in X-Y as depicted in FIG. 1. Module 14, see (FIG. 2), preferably contains the means for converting the single frequency beam from light source 10 into a two frequency, orthogonally polarized beam; conventional interferometers 52, 54 for doing the displacement measurement; optical mixers; and means to launch the mixed optical signals into optical fibers 26 and 28. electronic module 30 contains a stable electronic oscillator (not shown) which preferably provides an electrical signal 29 to an element 42 in the module 14 which converts the single frequency beam into a two frequency beam. Electronic module 30 also preferably contains lenses 32 and 34 for focusing the light signals from the interferometers 52, 54 onto photodetectors 36 and 38. The outputs of the photodetectors 36 and 38 are processed to yield the displacement information in any of a number of ways known in the art, see for example U.S. Pat. No. 4,688,926.

Figure 2:
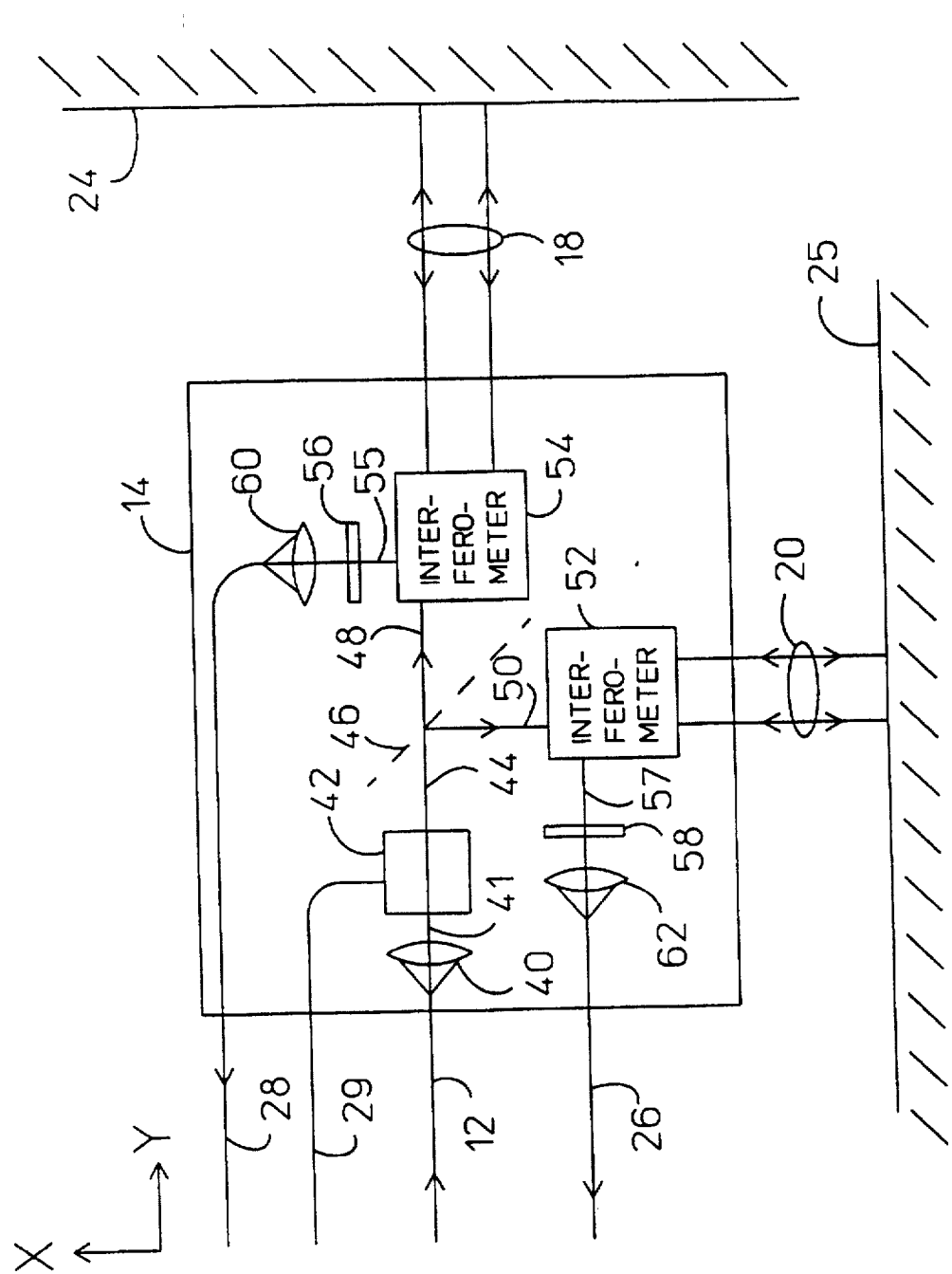
FIG. 2 is a drawing showing in schematic form the conversion module mounted on the moving stage in the embodiment of FIG. 1.

Referring now to FIG. 2, FIG. 2 describes in detail the conversion module 14. Module 14 preferably contains a single to two frequency generator 42, most preferably an acousto-optical device similar to that disclosed in commonly owned U.S. Pat. No. 4,684,828 and U.S. Pat. No. 4,687,958 and in commonly owned U.S. patent application Ser. No. 08/686,536. Lens 40 preferably collimates the single frequency beam exiting optical fiber 12 into single frequency beam 41. Beam 41 preferably passes through the two frequency generator 42 to produce a collimated two frequency beam 44. Beam 44 preferably passes through a conventional beam divider 46 to produce two beams 48 and 50, respectively. Beams 48 and 50 are the input beams for the interferometers 54 and 52, respectively. Interferometers 54 and 52 can be any of a variety of well known types, see for example "Differential Interferometer Arrangements for Distance and Angle Measurements: Principles, Advantages and Applications", C. Zanoni, pp. 93–106, VDI Berichte NR. 749, 1989. The measurement beams 18 and 20 preferably reflect from the plano mirrors 24 and 25, respectively, to provide interferometer output beams 55 and 57, respectively. Beams 55 and 57 then preferably pass through conventional polarizers 56 and 58, respectively, and are then launched into the optical fibers 28 and 12 respectively by lenses 60 and 62, respectively.

The principal advantages of the instant invention are that it allows the use of two frequency interferometry while keeping the light source off the moving stage. The only elements on the stage are the two frequency generator, the interferometers, the fiber optic pickups receivers, and some miscellaneous optics. This leads to a compact module with minimal heat generation on the moving stage.

While the invention has been described with reference to particular embodiments thereof, those skilled in the art will be able to make the various modifications to the described embodiments of the invention without departing from the true spirit and scope of the present invention. It is intended that all combinations of elements and steps which perform substantially the same function in substantially the same way to achieve the same result are within the scope of the invention.

What is claimed is:

1. An interferometric system for providing a measurement of motion of a moving stage, said system comprising:
   a source of a single frequency, linearly polarized, frequency stabilized light beam, said source being disposed remote from said moving stage and optically aligned therewith;
   optical fiber means disposed between said remote source and said moving stage for delivering said light beam to said moving stage;
   said moving stage comprising module means, said optical fiber means comprising means for delivering said light beam to said module means, said module means comprising means for converting said single frequency light beam delivered thereto into a two frequency, orthogonally polarized beam, said module means further comprising at least first and second interferometer means to produce first and second measurement beams and providing first and second light signal outputs for measuring said motion, respectively, based thereon;
   first and second fixed reflecting means disposed remote from said moving stage and optically aligned with said first and second interferometer means, respectively, for reflecting said first and second measurement beams, respectively for providing said first and second interferometer means light signal outputs for enabling measurement of motions of said moving stage relative to said first and second reflecting means; and
   means for converting said first and second light signal outputs into said measurement of displacement.

2. An interferometric system in accordance with claim 1 wherein said first and second reflecting means comprise plano mirrors.

3. An interferometric system in accordance with claim 2 wherein said means for converting said first and second light signal outputs into said measurement of displacement comprises photodetector means optically aligned with said first and second light signal outputs.

4. An interferometric system in accordance with claim 3 wherein said photodetector means comprises separate first and second photodetector means, respectively, for said first and second light signal outputs.

5. An interferometric system in accordance with claim 4 further comprising means for focusing said first and second light signal outputs on said first and second photodetector means, respectively.

6. An interferometric system in accordance with claim 5 wherein said means for converting said single frequency light beam into said two frequency light beam comprises acousto-optic means.

7. An interferometric system in accordance with claim 1 wherein said means for converting said first and second light signal outputs into said measurement of motion comprises photodetector means optically aligned with said first and second light signal outputs.

8. An interferometric system in accordance with claim 7 wherein said photodetector means comprises separate first and second photodetector means, respectively, for said first and second light signal outputs.

9. An interferometric system in accordance with claim 8 further comprising means for focusing said first and second light signal outputs on said first and second photodetector means, respectively.

10. An interferometric system in accordance with claim 9 wherein said means for converting said single frequency light beam into said two frequency light beam comprises acousto-optic means.

11. An interferometric system in accordance with claim 1 wherein said means for converting said single frequency light beam into said two frequency light beam comprises acousto-optic means.

12. An interferometric system in accordance with claim 1 wherein said frequency converting means comprises means for collimating said single frequency beam delivered thereto from said optical fiber means.

13. An interferometric system in accordance with claim 12 wherein said frequency converting means further comprises means for converting said collimated single frequency beam into a collimated two frequency beam, said collimated two frequency beam comprising said two frequency orthogonally polarized beam.

14. An interferometric system in accordance with claim 13 wherein said frequency converting means further comprises means for converting said two frequency beam into a pair of separate input beams for said first and second interferometer means, respectively.

15. An interferometric system in accordance with claim 14 wherein said module means further comprises polarizer means optically aligned with said first and second light signal outputs for passing said outputs therethrough.

16. An interferometric system in accordance with claim 1 wherein said module means further comprises polarizer means optically aligned with said first and second light signal outputs for passing said outputs therethrough.

* * * * *

UNITED STATES PATENT AND TRADEMARK OFFICE
CERTIFICATE OF CORRECTION

PATENT NO. : 5,724,136
DATED : March 3, 1998
INVENTOR(S) : Carl A. Zanoni

It is certified that error appears in the above-identified patent and that said Letters Patent is hereby corrected as shown below:

Column 4, Line 63: Delete "displacement"  Insert: -- motion --

Signed and Sealed this

Fifth Day of May, 1998

Attest:

BRUCE LEHMAN

Attesting Officer                Commissioner of Patents and Trademarks